US011915597B1

(12) United States Patent
Eaves et al.

(10) Patent No.: US 11,915,597 B1
(45) **Date of Patent: *Feb. 27, 2024**

(54) SYSTEM AND METHOD FOR UNMANNED AERIAL SYSTEM (UAS) MODERNIZATION FOR AVOIDANCE AND DETECTION

(71) Applicant: Architecture Technology Corporation, Minneapolis, MN (US)

(72) Inventors: Evan Eaves, Alexandria, VA (US); William Colligan, Vienna, VA (US)

(73) Assignee: Architecture Technology Corporation, Minneapolis, MN (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/683,871

(22) Filed: Mar. 1, 2022

Related U.S. Application Data

(63) Continuation of application No. 16/932,219, filed on Jul. 17, 2020, now Pat. No. 11,288,969, which is a continuation of application No. 15/793,304, filed on Oct. 25, 2017, now Pat. No. 10,726,729.

(51) Int. Cl.
*G08G 5/00* (2006.01)

(52) U.S. Cl.
CPC ........... *G08G 5/003* (2013.01); *G08G 5/0013* (2013.01); *G08G 5/0069* (2013.01); *G08G 5/0082* (2013.01)

(58) Field of Classification Search
CPC .... G08G 5/003; G08G 5/0013; G08G 5/0069; G08G 5/0082; G08G 5/0078; G08G 5/0008; G08G 5/0034
See application file for complete search history.

(56) References Cited

U.S. PATENT DOCUMENTS

| | | | | |
|---|---|---|---|---|
| 8,248,294 | B2 * | 8/2012 | Sampigethaya | G08G 5/0013 342/36 |
| 10,054,941 | B1 * | 8/2018 | Beard | G08G 5/006 |
| 2011/0057830 | A1 * | 3/2011 | Sampigethaya | G01S 11/08 342/36 |
| 2014/0327564 | A1 * | 11/2014 | Sampigethaya | H04B 7/18506 342/32 |
| 2017/0278409 | A1 * | 9/2017 | Johnson | G08G 5/0069 |
| 2018/0003656 | A1 * | 1/2018 | Michini | H02S 50/10 |
| 2018/0222582 | A1 * | 8/2018 | Ohata | G08G 5/006 |

* cited by examiner

*Primary Examiner* — Rami Khatib

(57) ABSTRACT

A computer-implemented method for securing unmanned aerial system (UAS) operations includes receiving a UAS flight plan for a UAS and a UAS operation, the UAS flight plan including a flight profile and flight path for the UAS; determining a mission type for the UAS operation requires use of dummy aircraft information; and assigning a dummy UAS identification for the UAS. Generating dummy airframe information, including dummy airframe characteristics and performance data, for the UAS, includes generating dummy airframe information that corresponds to airframe information for an actual civil aircraft that could follow the received UAS flight plan. The method further includes causing the UAS to broadcast the dummy UAS identification and the dummy airframe information with an automatic dependent surveillance-broadcast signal during at least a portion of the UAS operation.

20 Claims, 7 Drawing Sheets

SYSTEM AND METHOD FOR UNMANNED AERIAL SYSTEM (UAS) MODERNIZATION FOR AVOIDANCE AND DETECTION

RELATED APPLICATIONS

This application is a continuation of U.S. patent application Ser. No. 16/932,219 entitled "SYSTEM AND METHOD FOR UNMANNED AERIAL SYSTEM (UAS) MODERNIZATION FOR AVOIDANCE AND DETECTION," filed Jul. 17, 2020, now U.S. Pat. No. 11,288,969, issued Mar. 29, 2022 which is a continuation of U.S. patent application Ser. No. 15/793,304, filed Oct. 25, 2017, entitled "SYSTEM AND METHOD FOR UNMANNED AERIAL SYSTEM (UAS) MODERNIZATION FOR AVOIDANCE AND DETECTION," now U.S. Pat. No. 10,726,729, issued Jul. 28, 2020. The disclosures of these patent documents are hereby incorporated by reference.

BACKGROUND

The National Airspace System (NAS) includes the airspace, navigation facilities and airports of the United States, along with their associated information, services, rules, regulations, policies, procedures, personnel and equipment. These NAS components may be shared among private, commercial, and military aviation. Manned aircraft and unmanned aircraft systems (UAS) (sometimes referred to as unmanned aerial systems (UAS), unmanned aerial vehicles (UAV), and remotely piloted aircraft (RPA)) may operate in the NAS under control of Federal Aviation Administration (FAA) regulations. For manned aircraft, the FAA may require pilots to monitor the surrounding airspace for possible intruding aircraft and act to avoid a collision (sometimes referred to as detect-and-avoid (DAA)). For many UAS to be permitted in the NAS, the FAA requires the UAS be capable of a level of safety (Equivalent Level of Safety (ELOS)) equivalent to the detect-and-avoid requirements for manned aircraft. In effect, the UAS is required to operate to the same safety standards as a manned aircraft on instrument flight rules (IFR). Hobbyist UAS may be exempt from ELOS requirements provided the hobbyist UAS weighs less than a specified amount, is flown in line-of-sight of the UAS operator, and is flown below a specified altitude.

A manned aircraft flight through the NAS typically begins and ends at an airport, the airport may be controlled (by a tower) or uncontrolled. On departure, the aircraft may operate in one of five of the six airspace classes (based in part on altitude) with different flight rules for each airspace class. For example, depending on the airspace class and flight conditions, communication between pilots and controllers may be required. While Operation of an aircraft is the responsibility of the pilot, air traffic controllers (ATC) may give instructions for sequencing and safety as needed. After a controlled flight becomes airborne, control passes from the tower ATC who authorized the takeoff to a Terminal Radar Approach Control (TRACON). Between sectors administered by TRACONs are 21 contiguous areas of the NAS above 18,000 feet (class A airspace). Each of the 21 areas is managed by an Air Route Traffic Control Center (ARTCC), and generally referred to as a "Center," that provide control functions. The ARTCCs manage more than 690 ATC facilities with associated systems and equipment to provide radar and communication services to aircraft transiting the NAS. An aircraft is handed off from one Center to another until the aircraft descends near its destination, when control is transferred to the TRACON serving the destination, and ultimately to the tower ATC serving the destination airport. Some airports have no TRACON around them, and control goes directly to or from a Center. Some flights are low enough and short enough that control is kept within one or more TRACONs without ever being passed to Center.

The NAS is transitioning to a Next Generation Air Transportation System ("NextGen" system), a feature of which involves non-radar surveillance of aircraft that are equipped with GPS satellite-based navigation systems, and that continuously broadcast their location. Receivers integrated into the air traffic control system or installed aboard other aircraft may receive the broadcast signals to provide an accurate depiction of real-time aviation traffic, both in the air and on the ground. This feature, known as ADS-B (automatic dependent surveillance-broadcast) is intended to provide not only enhanced aircraft separation, but also to allow pilots to use more precise and efficient landing paths, saving time and fuel. The FAA has mandated partial implementation of ADS-B by 2020.

Thus, one benefit of ADS-B may be improved situational awareness: through its broadcast signals, ADS-B may enhance safety by making an aircraft "visible," in real-time, to air traffic control and to other appropriately equipped ADS-B aircraft. However, ADS-B also provides traffic- and government-generated graphical weather information and other data through TIS-B and FIS-B. Traffic Information Services-Broadcast, (TIS-B), is a component of the ADS-B technology that provides free traffic reporting services to aircraft equipped with ADS-B receivers. TIS-B allows non-ADS-B transponder equipped aircraft that are tracked by radar to have their location and track information broadcast to ADS-B equipped aircraft. Flight Information Services-Broadcast (FIS-B), also is a component of ADS-B technology that provides free graphical National Weather Service products, temporary flight restrictions (TFRs), and special use airspace information enabling pilots to increase levels of safety in the cockpit and on the ground.

ADS-B consists of two different services, ADS-B Out and ADS-B In. ADS-B Out periodically broadcasts aircraft information, such as identification (e.g., through an aircraft call sign), current position, altitude, and velocity, for example. ADS-B In refers to the reception by aircraft ADS-B data including broadcasts from nearby aircraft as well as graphical weather data (from FIS-B and TIS-B). ADS-B Out relies on two avionics components—a high-integrity GPS navigation source and a datalink (ADS-B unit). There are several types of certified ADS-B data links, the most common of which operate at 1090 MHz, essentially a modified Mode S transponder, or at 978 MHz. (Mode S or mode "select," is a way to interrogate a specific aircraft by using a distinct address, such as an aircraft address, to which only the specific aircraft will respond. In addition to an aircraft identification signal, the Mode S transponder may provide other useful flight information.) Thus, to achieve ADS-B Out capability at 1090 MHz, an aircraft need only have installed an appropriate transponder and a certified GPS position source.

Two aspects of ADS-B operations may be of concern to general, commercial, and military aviation entities; namely (1) a lack of anonymity and (2) a lack of encryption, which may compromise manned and unmanned aircraft security. One aspect of ADS-B is that its operation may remove anonymity for aircraft observing visual flight rule (VFR) aircraft operations. This is because the International Civil Aviation Organization (ICAO) specifically assigns a unique 24-bit transponder code to each aircraft to allow monitoring of that aircraft when within the service volumes of the Mode-S/ADS-B system. Thus, unlike Mode A/C transponders, there is no code "1200"/"7000" to provide casual anonymity (for example, for a VFR flight, 1200 is the standard transponder code used in the NAS when no other code has been assigned). Mode-S/ADS-B identifies the aircraft uniquely among all aircraft in the world, in a manner similar to that of a MAC number for an Ethernet card or the International Mobile Equipment Identity (IMEI) of a GSM phone. Another aspect of the ADS-B broadcast of aircraft data is that the broadcast occurs over unencrypted data links. This means that the content of ADS-B broadcasts can be read by anybody who has the ability to use relatively simple receiving equipment such as a software defined radio to access the ADS-B broadcast.

SUMMARY

A computer-implemented method for securing unmanned aerial system (UAS) operations includes receiving a UAS flight plan for a UAS and a UAS operation, the UAS flight plan including a flight profile and flight path for the UAS; determining a mission type for the UAS operation requires use of dummy aircraft information; and assigning a dummy UAS identification for the UAS. Generating dummy airframe information, including dummy airframe characteristics and performance data, for the UAS, includes generating dummy airframe information that corresponds to airframe information for an actual civil aircraft that could follow the received UAS flight plan. The method further includes causing the UAS to broadcast the dummy UAS identification and the dummy airframe information with an automatic dependent surveillance-broadcast signal during at least a portion of the UAS operation.

A computer-implemented method for securing unmanned aerial system (UAS) operations includes receiving a UAS flight plan for a UAS and a UAS operation, the UAS operation including a flight profile and flight path for the UAS; determining a type for the UAS operation is sensitive; assigning a dummy UAS identification for the UAS; generating dummy airframe information for the UAS; and causing the UAS to broadcast the dummy UAS identification and the dummy airframe information with an automatic dependent surveillance-broadcast signal during at least a portion of the UAS operation.

A system for securing unmanned aerial system (UAS) operations includes multiple, geographically-separated processors. Each processor executes machine instructions encoded on a non-transitory, computer-readable storage media. The processors cooperate to receive a UAS flight plan for a UAS and a UAS operation, the UAS operation including a flight profile and flight path for the UAS; determine a type for the UAS operation is sensitive; assign dummy UAS identification for the UAS; generate dummy airframe information for the UAS. A selected one of the processors executes to identify flight conditions for the UAS in the flight profile, identify UAS flight characteristics of the UAS for the identified flight conditions, compare the UAS flight characteristics to flight characteristics for multiple aircraft under flight conditions similar to the identified flight conditions, select an aircraft having flight characteristics that are a closest match to the UAS flight characteristics as a basis for the dummy airframe information, and generate the dummy airframe information using the selected aircraft flight characteristics; and cause an automatic dependent surveillance-broadcast (ADS-B) transponder on the UAS to broadcast the dummy UAS identification and the dummy airframe information with an ADS-B signal during at least a portion of the UAS operation.

A non-transitory, computer-readable storage medium has encoded thereon machine instructions executable by a processor for securing unmanned aerial system (UAS) operations. The processor executes the machine instructions to receive a UAS flight plan for a UAS and a UAS operation, the UAS operation including a flight profile and flight path for the UAS; determine a type for the UAS operation is sensitive; assign dummy UAS identification for the UAS; generate dummy airframe information for the UAS; and cause the UAS to broadcast the dummy UAS identification and the dummy airframe information with an automatic dependent surveillance-broadcast signal during at least a portion of the UAS operation.

DESCRIPTION OF THE DRAWINGS

The detailed description refers to the following figures in which like numerals refer to like objects, and in which.

DETAILED DESCRIPTION

Figure 1A:
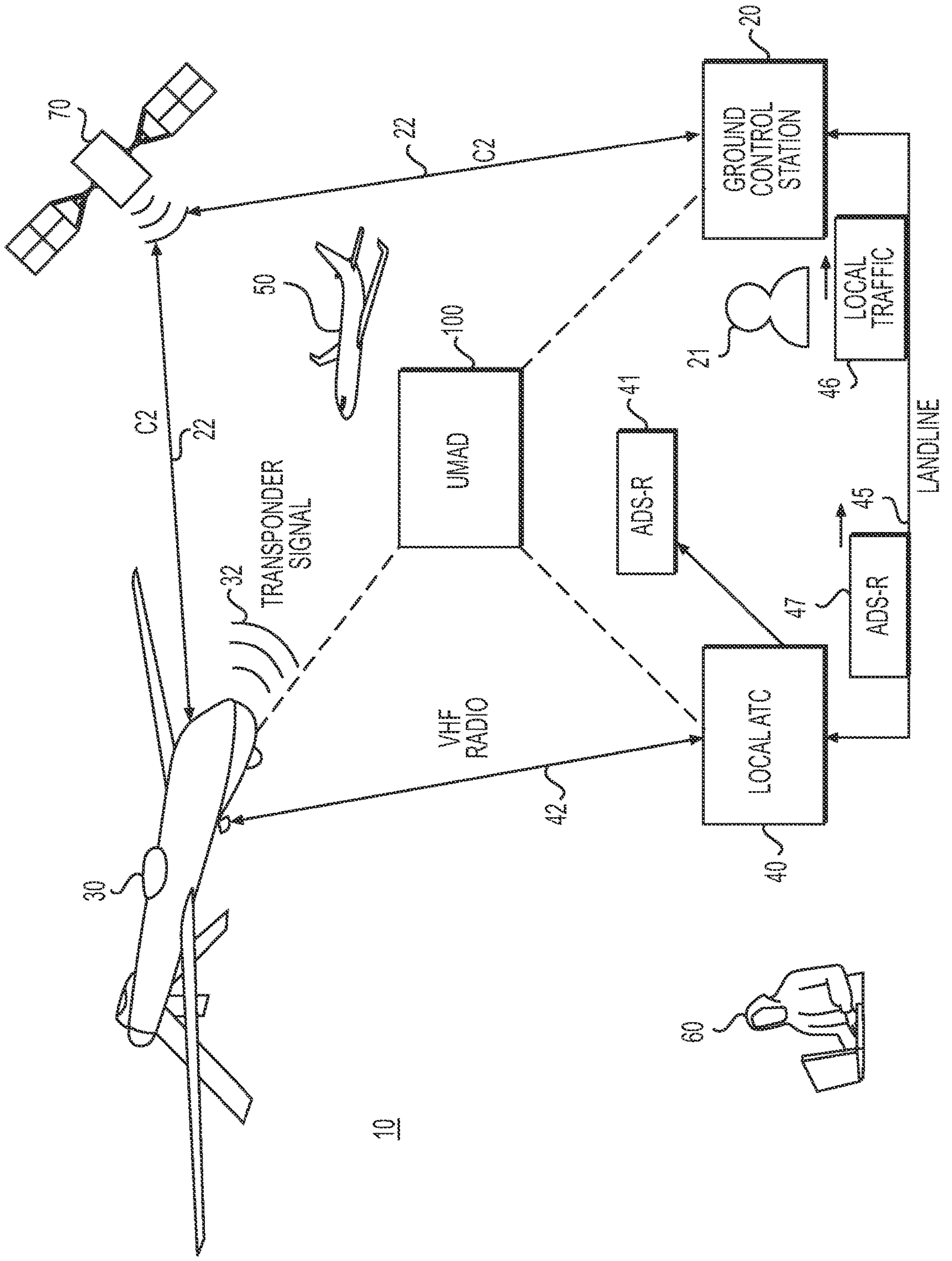
FIG. 1A illustrates an environment in which a system for unmanned aerial system modernization for avoidance and detection (UMAD) may be implemented.

Many aircraft operating in the National Airspace System (NAS) use Automated Dependent Surveillance—Broadcast (ADS-B) systems to reduce the risk of in-flight collisions. The systems may include an ADS-B transponder that broadcasts an ADS-B Out signal. The broadcast signal may be received by air traffic controllers and aircraft equipped with ADS-B receivers. The broadcast signals also may be received by any party with a properly-configured receiver. The ADS-B message broadcasts GPS position (latitude, longitude), pressure, altitude, and a unique, ICAO-assigned, transponder code, as well as track and ground speed (separated into messages carrying 10 bytes of data each). The transponder code may be used to unambiguously identify the carrying aircraft. In addition, other of this information may be sensitive. However, ADS-B messages are not encrypted and thus intercepted ADS-B messages may be read by any intercepting party. For example, hobbyist software defined radio (SDR) users can, with little expense or expertise, cross-reference the ADS-B transmissions they receive to FAA public registration data. With this technique widely available, anyone can use this real-time data to acquire sensitive flight information and to identify the broadcasting aircraft. Thus, some entities operating in the NAS may be concerned that an intercepted ADS-B Out signal may be used to exploit sensitive flight information related to a specific aircraft (manned or unmanned). Accordingly, while the FAA has mandated incorporation of ADS-B capabilities for increased NAS safety and efficiency, some entities may not be able to provide a desired level of security for its aircraft when adopting ADS-B.

This potential lack of security with ADS-B transmissions also may be of concern to users of unmanned aircraft systems (UASs), and may present a major obstacle to overcome in terms of security in order to benefit from ADS-B. For example, some UAS users may employ encrypted Mode 5 communication to eliminate vulnerabilities, but encryption and ADS-B as currently used are mutually exclusive. Therefore, these UAS users must meet ADS-B equipage requirements to fly in the NAS, creating a conflict with their desire for secure communications. Another option might include leveraging TIS-B and FIS-B services, which are free and available, and which may provide comprehensive NAS data. However, these services may not be available via RF broadcast to a UAS ground control station when a UAS and its ground control station are widely separated. This means that the UAS would have to use onboard signal down-links from a satellite to the UAS ground control station; this process is bandwidth-intensive and increases latency of all signal transmissions. Furthermore, small UAS may not have the capability of relaying local traffic broadcasts due to onboard equipment limitations. For example, a UAS flying over Oklahoma may receive a local ADS-R signal from the Oklahoma City TIS-B transceiver. However, the UAS operator flying the UAS may be located in Seattle, Washington. The TIS-B transmission of Oklahoma City local traffic is well out of range of the Seattle ground control station. The UAS could use the satellite data link but adding traffic services to this data link adds latency and slows down other higher priority data.

Thus, implementation of ADS-B provides, on the one hand, enhanced flight awareness, but on the other hand, exposes certain aircraft to security vulnerabilities. To provide secure, enhanced flight awareness, disclosed herein is a system, and corresponding method, for UAS modernization for avoidance and detection (UMAD) that leverages systems and services currently available in the NAS. In particular, the UMAD system addresses the problem associated with ADS-B implementation on UASs. The UMAD provides the ability to display UAS traffic to a UAS operator regardless of the UAS operator's location, and the ability to secure ADS-B information for sensitive flight operations.

FIG. 1A illustrates an example NAS environment 10 for a UAS in which UMAD 100 operates to provide secure enhanced flight awareness for the UAS and a UAS operator as well as for other aircraft operating in the vicinity of the UAS. In FIG. 1A, UAS 30 is controlled from remote ground control station 20 by UAS operator 21 using command and control (C2) communication link 22 through satellite 70. The C2 communication link 22 is shown in FIG. 1A as a satellite link. However, C2 communication between the UAS 30 and the ground control station 20 may be provided through a line of sight (LOS) link (not shown). Within the NAS, the UAS 30 may be in contact with local ATC 40 using radio communication 42 (typically VHF radio), as a LOS link. (Note that with the UAS 30 at altitude 18,000 feet, the maximum LOS from the UAS 30 to the ground control station 20 or the ATC 40 is approximately 150 nautical miles.) Also shown in FIG. 1A, local copies of UMAD 100 may be instantiated on one or more of the entities shown in FIG. 1A, specifically ground control station 20, UAS 30, and local ATC 40.

Figure 1B:
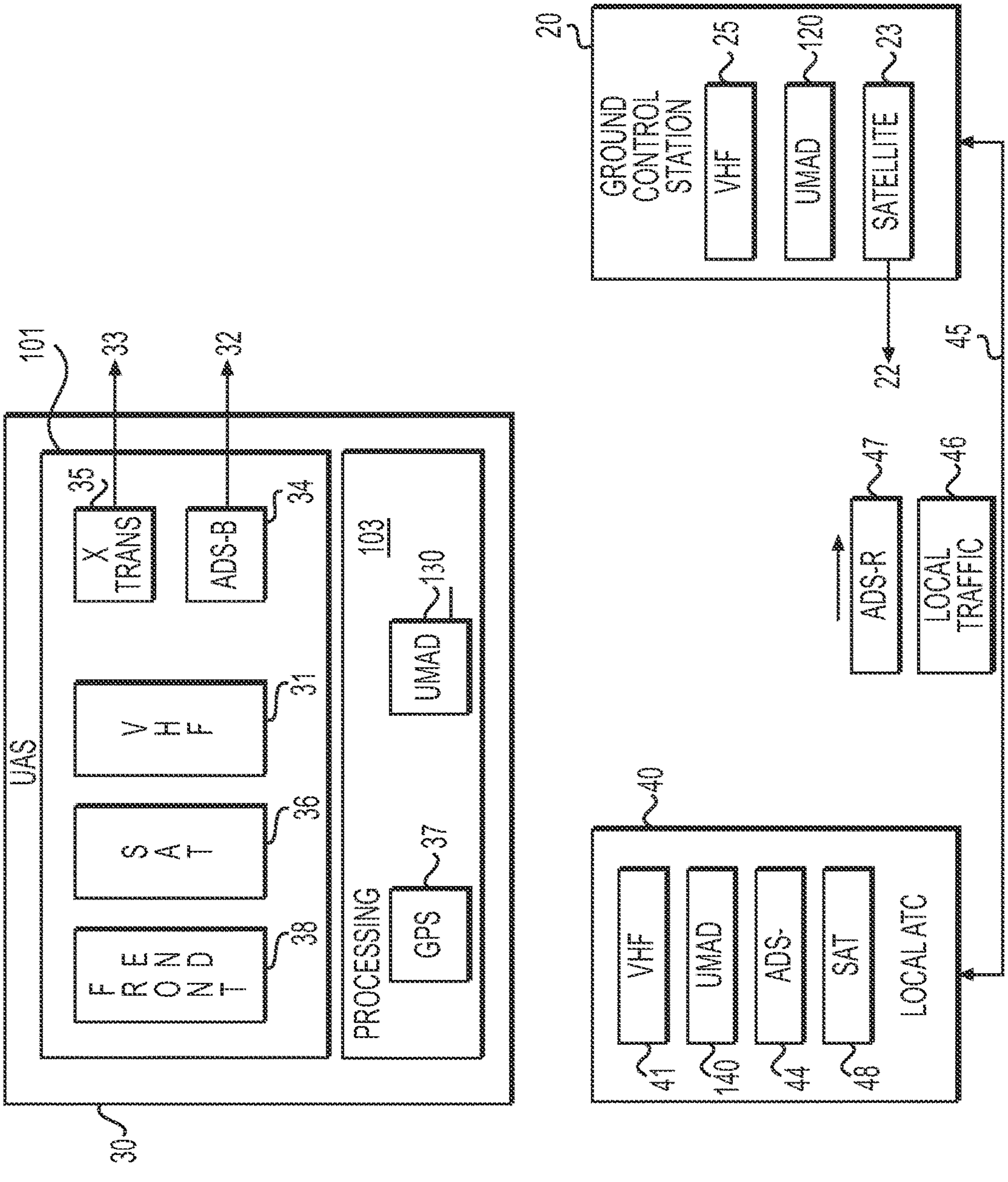
FIG. 1B illustrates aspects of systems that may operate in the environment of FIG. 1A.

Turning to FIG. 1B, the UAS 30 is equipped with a communications system 101 and a processor system 103. The processor system 103 may include a local copy of the UMAD 100 (denoted as UMAD 130), which is linked to ADS-B transponder 34 of the communications system 101. Also shown is X transponder 35, which may be a Mode 5 transponder, and which broadcasts transponder signal 33. In an aspect, the UAS 30 may be assigned a unique transponder code that may be used to positively identify the UAS 30 through operation of X transponder 35. However, transponder signal 33 may be encrypted. In FIG. 1B, the X transponder 35 and the ADS-B transponder 34 are shown as separate devices. However, both transponder functions may be incorporated into a single transponder. The UMAD 130 and ADS-B transponder 34 cooperate to broadcast a FAA-compliant ADS-B signal 32. However, in an aspect, through operation of the UMAD 130, the UAS 30 may be assigned a transponder code with a "dummy aircraft identification." The dummy aircraft identification may, but need not, be broadcast by the ADS-B transponder 34 as a part of the ADS-B signal 32, and only limited entities may be able to interpret the dummy aircraft identification to identify the UAS 30. The ADS-B signal 32 also may include other dummy airframe information that may be similar to actual airframe information (e.g., altitude, speed, heading, wingspan) for the operating UAS-30. As described herein, whether the ADS-B signal 32 includes such "dummy aircraft information" (i.e., dummy aircraft identification and dummy airframe information) may depend on the mission being executed by the UAS 30. In addition to the transponders 34 and 35, the communications system 101 of the UAS 30 includes VHF transceiver 31 for line of sight radio communication, RF front end 38, and satellite transceiver 36; the processor system 103 includes GPS 37 for precise UAS 30 position data.

As further shown in FIG. 1B, the ground control station 20 includes a local copy of the UMAD 100 (UMAD 120) and the ATC 40 includes a similar local copy, UMAD 140. The UMADs 120 and 140, which are disclosed in more detail herein, including with respect to FIGS. 2A and 2B, may be used to correctly identify the UAS 30. In an aspect, the UMADs 100, 120, 130, and 140 may be identical. The local ATC 40 includes VHF transceiver 41 through which the local ATC 40 may communicate, line of sight, with the UAS 30. The local ATC 40 also includes ADS-B receiver 44 by which ADS-B signal 32 may be received from UAS 30 via a line of sight path. The local ATC 40 further may include satellite transceiver 48.

The ground control station 20 likely is beyond line of sight (BLOS) of the UAS 30. The ground control station 20 includes VHF transceiver 25, UMAD 120, and satellite transceiver 23. The satellite transceiver 23 may be used for BLOS command and control, as shown in FIG. 1A, with UAS 30.

In FIG. 1A, the ADS-B signal 32 may be intercepted by commercial aircraft 50 and dangerous interceptor 60. In one aspect, the ADS-B signal 32 is non-secure in that it is not encrypted. However, because the commercial aircraft 50 and dangerous interceptor 60 do not have access to a UMAD 100, these entities are unable to match any dummy aircraft information (e.g., the dummy aircraft identification) that may be contained in the ADS-B signal 32 from the UAS 30.

As noted above, the ADS-B signal 32 may be received by local ATC 40, which is in the same NAS region as UAS 30. The ADS-B signal 32 also may be received at a UMAD 100-equipped entity such as the ground control station 20 when the ground control station 20 is within LOS range of the UAS 30. In an aspect, UMADs 120 and 140 may receive real-time data transmitting over 1090 MHz ES (Elementary Surveillance), 978 MHz UAT (universal access transceiver) for TIS-B, ADS-R frequencies through Mode C or S signal communication equipment (Mode S is discussed above; Mode C refers to a transponder that provides an aircraft identification signal and aircraft altitude (actually pressure). Mode 5 refers to a cryptographically secure version of Mode S and ADS-B GPS position.) The UMAD 140 provides local traffic information 46 from TIS-B and FIS-B at ATC 40 to the ground control station 20 through landline 45. Additionally, the local ATC 40 may provide ADS-R signal 47 through landline 45 to ground control station 20. As an alternative to landline 45, the local ATC 40 and ground control 20 may communicate by other means such as by satellite communications. UMADs 120 and 140 may use the identification data that are broadcast by the UAS transponder 34 to identify the UAS 30 and to "see" or "lookup" the actual aircraft specifications (size, type, airworthiness, certifications, etc.) and performance capabilities of the UAS 30.

Figure 2A:
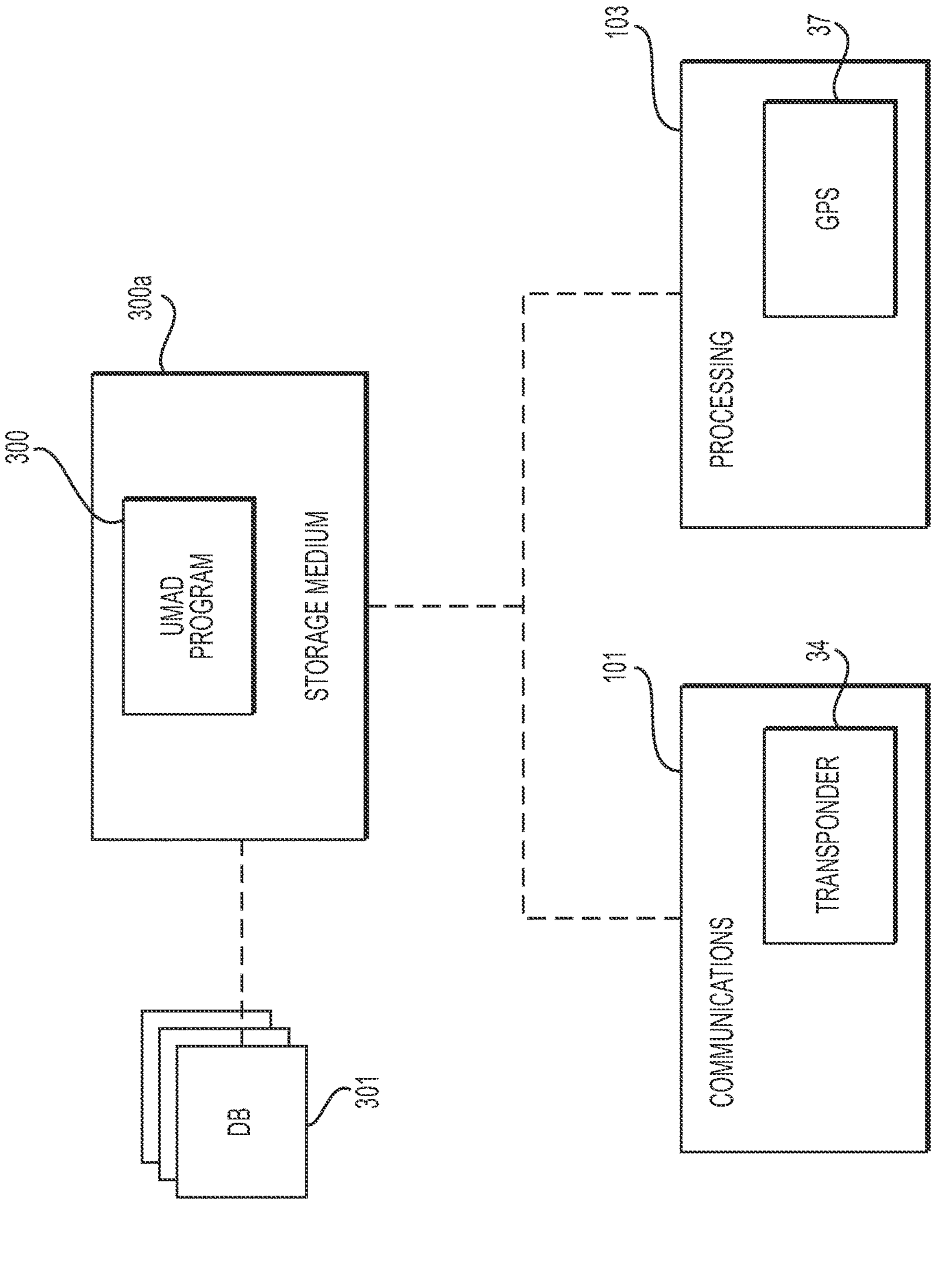
FIGS. 2A-2B illustrate example examples of the UMAD.
Figure 2B:
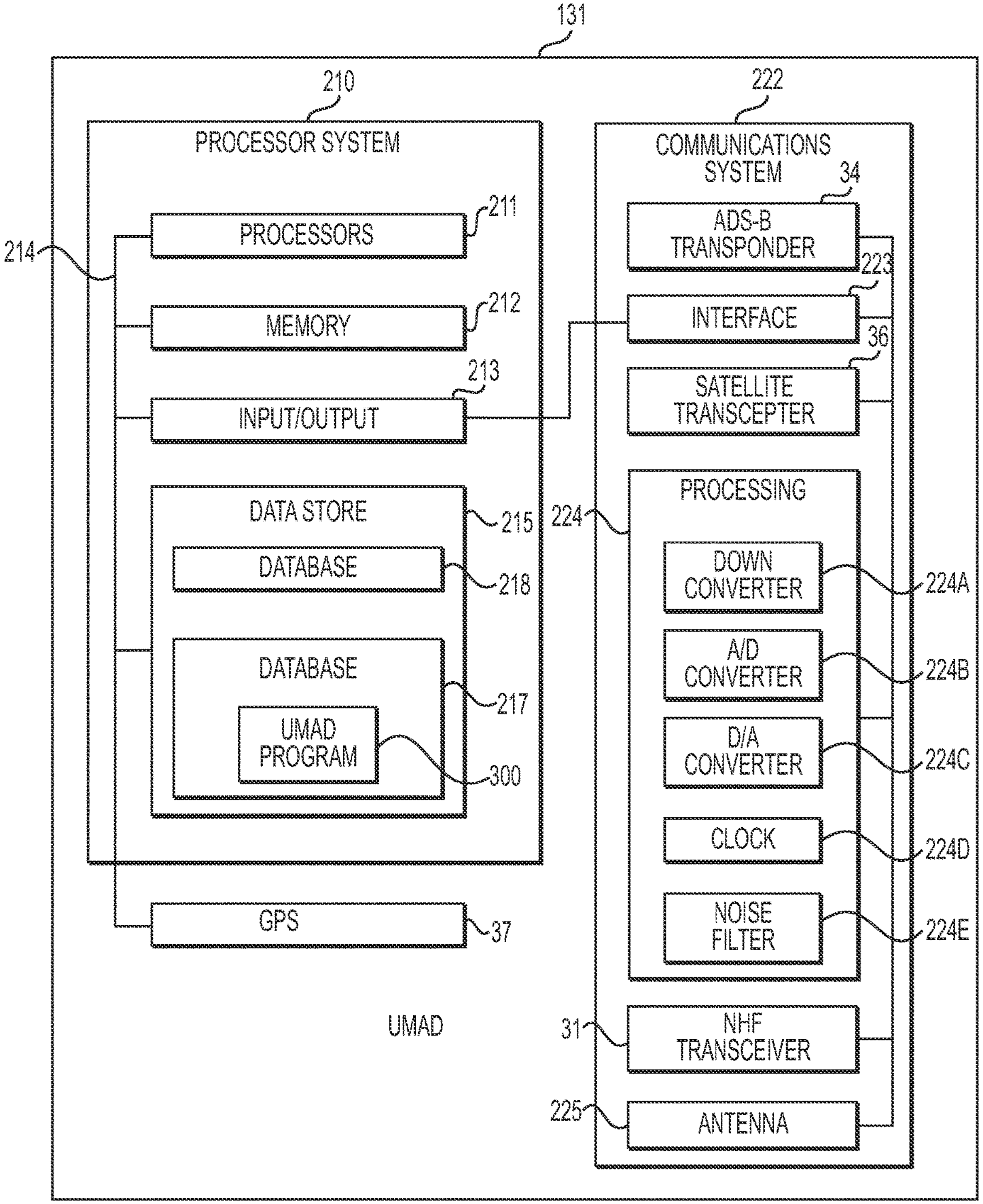

FIGS. 2A and 2B illustrate examples of a UMAD 100 as instantiated on one or more of the UAS 30, ATC 40 and ground control station 20. In the specific example of FIG. 2A (and with reference to FIGS. 1A and 1B), UMAD 130 is installed on UAS 30 (as noted herein, UMADs 130, 120, and 140 may be identical; however, the processes executed by the UMAD 100 may depend on the platform on which it is installed). In an aspect, the UMAD 100 may execute based on a mission type assigned to the UAS 30. That is, the UMAD 100 may treat UAS data differently depending on the UAS's mission type. To perform these functions, UMAD 100 may employ autonomous and automatic operations to identify, process, and control data broadcast from the UAS 30 with minimal latency. In this function, when necessary, UMAD 100 generates "dummy call-signs" (i.e., a dummy aircraft identification or dummy transponder code) and "dummy airframe information" for UAS 30 based on the mission assigned to the UAS 30. However, the UMAD 100 may store the actual ADS-B identification (e.g., an ICAO-assigned ADS-B transponder code) assigned to the UAS 30 regardless of the flight or mission type assigned to the UAS 30. The dummy airframe information may include mock civil aircraft data generated by the UMAD 100. The mock civil aircraft data may closely match the actual performance profile of the operating UAS 30. UAS operator 21 and ATC 40 personnel may have access to both sets of UAS identification for their own system automation and usage, while the UMAD 100 controls transponder 34 to transmit only the dummy airframe identification and dummy airframe information, where the dummy aircraft information may be intercepted by civil/public entities such as aircraft 50 operating in the NAS in the vicinity of UAS 30. Neither the ADS-B signal 32 nor a corresponding ADS-R broadcast 41 contains actual UAS identification information; rather, both contain dummy aircraft information data, and thus, neither the ADS-B signal 32 nor the ADS-R broadcast 41 can be linked to the UAS 30.

In an aspect, UAS 30 may engage in three mission types, namely, non-secure, sensitive, and covert. For non-secure missions, the UMAD 100 may not generate dummy aircraft information, and the ADS-B signal from ADS-B transponder 34 may include the actual UAS identification and actual UAS airframe information. For sensitive operations, the UMAD 100 may generate dummy aircraft information, which then is transmitted with the ADS-B signal 32. Note that for either non-secure and sensitive mission types, the X transponder 35 may broadcast actual UAS 30 identification; however, the X transponder signal 33 may be encrypted.

As a specific example, the UAS 30 may be a military UAS performing an air refueling mission in the NAS within a high traffic region with manned and unmanned flights. UMAD 130 provides dummy airframe information and a dummy aircraft identification for broadcast by ADS-B transponder 34 during the air refueling mission. Aircraft 50 operating in the vicinity of UAS 30 receives the ADS-B signal 32, which indicates to the cockpit crew of aircraft 50 that the broadcasting aircraft (the UAS 30) is a small civil aircraft having characteristics closely matching those of UAS 30. The ATC 40 receives the same ADS-B signal 32 and uses UMAD 140 to determine the actual aircraft is UAS 30. Because the UAS 30 operator 21 would benefit from access to ADS-B data related to other aircraft in the vicinity of UAS 30, UMAD 140 cooperates with components of the local ATC 40 to feed direct traffic information 47 from the local Traffic Information Service-Broadcast (TIS-B) and Flight Information Service (FIS-B) to the UAS ground control station 20 even though the ground control station 20 may be located hundreds of miles from the UAS 30.

In an aspect, the UMADs 120, 130, and 140 form a system for securing unmanned aerial system (UAS) operations using multiple, geographically-separated processors. Each processor executes machine instructions encoded on non-transitory, computer-readable storage media. The processors cooperate to receive a UAS flight plan for a UAS and a UAS operation, the UAS operation including a flight profile and flight path for the UAS; determine a type for the UAS operation is sensitive; assign dummy UAS identification for the UAS; and generate dummy airframe information for the UAS. A selected one of the processors executes to identify flight conditions for the UAS in the flight profile, identify UAS flight characteristics of the UAS for the identified flight conditions, compare the UAS flight characteristics to flight characteristics for multiple aircraft under flight conditions similar to the identified flight conditions, select an aircraft having flight characteristics that are a closest match to the UAS flight characteristics as a basis for the dummy airframe information, and generate the dummy airframe information using the selected aircraft flight characteristics. The selected processor further causes an automatic dependent surveillance-broadcast (ADS-B) transponder on the UAS to broadcast the dummy UAS identification and the dummy airframe information with an ADS-B signal during at least a portion of the UAS operation.

FIGS. 2A and 2B illustrate in more detail, examples of local copies of UMAD 100 (namely, UMADs 120, 130, and 140) of FIG. 1B. In general, the UMAD 100 operates autonomously and automatically once initiated. However, since the UAS 30 may be located in a region of the NAS remote from the ground control station 20, in an aspect, operator 21 may interface with the UAS 30, including the UMAD 130, to provide manual inputs and commands, and to receive data outputs using LOS or satellite command and control signal 22. In general, for the UMAD 120 to receive ADS-B data directly from UAS 30, the UAS 30 and UMAD 120 must be within about 150 nautical miles of each other, or closer. Thus, the effective region of the UMAD 120 may be a circle of diameter 300 miles, at most. Accordingly, the UMAD 120 generally receives ADS-B data from the local ATC 40, which as noted herein may be within line of sight of the UAS 30.

In FIG. 2A, UMAD 130 is coupled to existing communication systems 101 of the UAS 30, which includes ASD-B transponder 34. In an aspect of this example, the UMAD 130 also is coupled to, or is a component of, existing processing system 101 of the UAS 30, which includes GPS 37. Thus, in this example, the UMAD 130 includes UMAD program 300 provided on non-transitory, computer-readable storage medium 300*a*. The UMAD program 300 includes machine instructions that when executed, control certain operations of the communication system 103 and the processing system 101. The structure and functions of UMAD program 300 are disclosed herein, including with respect to FIG. 3. In an aspect, components of the UMAD program 300 may generate and maintain one or more databases 301 that contain data generated by and data used by the UMAD program 300.

In another UMAD example, shown in FIG. 2B, UMAD 131 includes processor system 210. Processor system 210 in turn includes processors 211, memory 212, input/output 213, system bus 214, and data store 215. The data store 215 includes a database manager and databases 217 and 218. The databases 217 and 218 are non-transitory, computer-readable storage media. The database 217 includes UMAD program 300, which comprises machine instructions that, when executed, control operation of the UMAD 131. Finally, the processor system 210 may be connected to GPS 37. In operation of the UMAD 131, a processor 211 may access the UMAD program 300, load the UMAD program 300 into memory 212, and execute the machine instructions comprising the UMAD program 300. Database 218 includes data read by the UMAD program 300, and data written by the UMAD program 300 to the database 218. Data stored in database 218 may include identification data that is broadcast by the UAS 30 ADS-B transponder 34 to identify or allow lookup of the UAS's specifications (size, type, airworthiness, certifications, etc.) and performance capabilities. UMAD program 300 stores the actual UAS identification regardless of the UAS flight or mission type (e.g., ADS-B transponder code, Mode 5 transponder code). To further secure the UAS identification, UMAD program 300 may generate mock civil aircraft data that closely matches the performance profile of the operating UAS 30. For example, the UAS 30 may be similar in many respects to a small civil aircraft such as a single-engine Cessna. In this example, the UMAD program 300 may use the single-engine Cessna characteristics in generating the mock civil UAS data. (Note that, for example, a Cessna 172 may have an effective service ceiling of less than 18,000 feet.) The UMAD program 300 further executes to provide both UAS operators 21 and ATC personnel access to both sets of aircraft data and both aircraft identifications, while the UMAD program 300 causes ADS-B transponder 34 to transmit the dummy identification to civil/public entities.

In the example of FIG. 2B, the UMAD 131 further includes communications system 222. The communications system 222 includes ADS-B transponder 34. The ADS-B transponder 34 may operate at 1090 MHz. The ADS-B transponder 34 is coupled to interface 223, which receives command signals from UMAD program 300. The interface 223 also is coupled to satellite transceiver 36 and VHF transceiver 31 through which the UAS 30 receives command and control signal 22. The communications system 222 further includes processing component 224, which receives processed data derived from communications signals received at UAS 30 and provides the processed data to the UMAD program 300. Still further, the communications system 222 includes receive/transmit antenna 225. The antenna 225, VHF transceiver 31, and some elements of the processing component 224 may be analog (the RF signal being analog) and may be referred to as the RF front end. VHF transceiver 31 receives RF signals from other RF transmitters. The processing component 224 includes a down converter 224A that down converts the analog RF signal to a baseband signal, an analog to digital (A/D) converter 224B that converts the baseband signal to a digital signal, and a corresponding D/A converter 224C. In an example, the communications system 222 may incorporate a local clock 224D, which may be used to time-stamp the digitized baseband signal. The processing component 224 also may include a noise filter 224E. The noise filter 224E smooths the RF signal and minimizes the effect of environmental noise. Processor 211 executes the UMAD program 300 instructions to operate the communications system 222.

The antenna 225 may be omni-directional and also may incorporate some form of beam steering or directionality. The antenna 225 may be a hardware antenna or may be a software defined antenna. The antenna 225 may be used for transmission and reception. The antenna 225 may enable digital and analog signaling.

Figure 3:
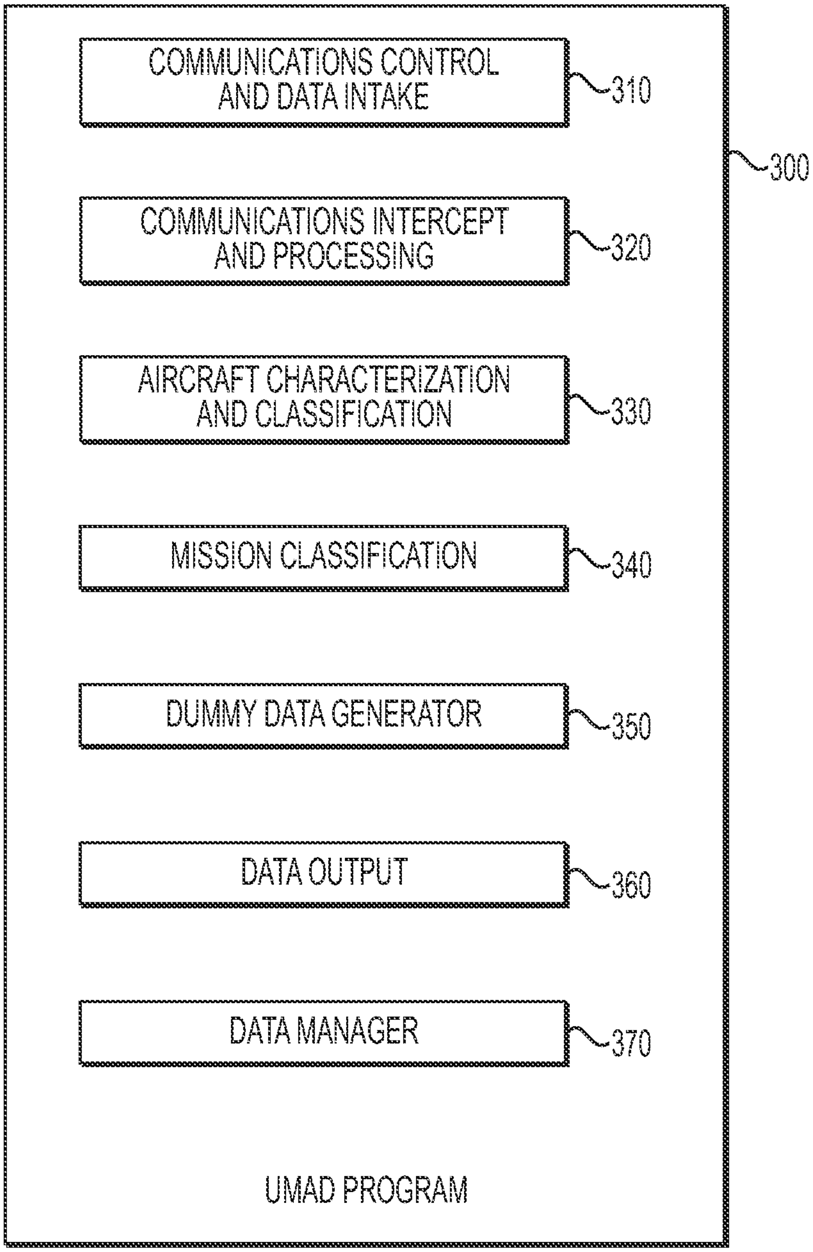
FIG. 3 illustrates an example UMAD program.

FIG. 3 illustrates an example UMAD program 300. The UMAD program 300 may be identical in each of the local UMADs 120, 130, and 140. The UMAD program 300 includes communications control and data intake module 310, communication intercept and processing module 320, aircraft characterization and classification module 330, mission classification module 340, dummy data generator module 350, data output module 360, and data manager module 370.

UMAD program 300 interacts with several external systems or components shown in FIG. 1A (e.g., components of each of the UAS ground control station 20, UAS 30, and ATC 40), and may feed data to and ingest data from each of the external systems and their components depending on the platform on which the UMAD program 300 is implemented. The communications control and data intake module 310 may receive information and data from many sources, including TIS-B, UAS 30, ATC 40, and ground control station 20. In an aspect, the module 310 may receive real-time data transmitted over 1090 MHz ES, 978 MHz UAT (for TIS-B, ADS-R) frequencies through Mode C, 5, or S signal communication equipment and processed by an onboard communications and processing systems 101 and 103. The module 310 receives and processes high volume data transmissions broadcasting from manned aircraft, UAS, and/or radio ground stations concurrently, within a given region of the NAS. The module 310 controls the communications system 101 to prevent UAS co-channel interference from manned air-to-air ADS-B which could negatively impact the UMAD 130. Additionally, the module 310 may control the communications system 101 using lost-link contingency plans to ensure the UMAD 130 provides service in unfavorable environments. These connection losses can arise from disruption to the communication system 101 onboard the UAS 30 or from more localized events in the NAS region such as signal dampening, weather, or physical objects (trees, buildings, etc.) as well as communication loss to the UAS 30 from signal interference, blanking, or the UAS 30 flying out of range of the ground control station 20 (when in line of sight control) or the ATC 40. In an aspect, upon loss of C2 communication, the UMAD 130 may compel the transponder 34 to broadcast an ADS-B signal containing the ICAO-assigned transponder code and the actual UAS airframe information.

Since the traffic environment at the UAS location is dynamic, the communication intercept and processing module 320 processes various UAS-related data as the data are received to ensure minimal data latency between TIS-B stations (e.g., at ATC 40) and UAS operator 21. These data may include dummy airframe information transmitted with ADS-B signal 32 and TIS-B data for other aircraft in the vicinity of UAS-30.

The aircraft characterization and classification module 330 (e.g., at ATC 40) uses the dummy identification data that are broadcast by the ADS-B transponder 34 to identify the UAS 30 and to lookup in a local database 301 the UAS's specifications (size, type, airworthiness, certifications, etc.) and performance capabilities. For a specific UAS flight, the module 330 functions may begin with ingestion of data from the UAS-30 flight plan. The module 330 correlates dummy aircraft information with actual aircraft identification information for UAS 30. For example, at ATC 40, ATC automation systems may feed UAS-30 flight plan identification information to the air traffic controller's display. With UAS flying according to Instrument Flight Rules (IFR) the air traffic controller may provide separation for the UAS 30. The air traffic controller over radio communication may refer to the UAS 30 by its ICAO-assigned identification while all public traffic receives a dummy aircraft identification on their traffic service displays.

Mission classification module 340 receives a mission type designation, which may be included with the UAS's flight plan, or may be separately provided, and determines whether to invoke dummy aircraft identification processes. In an example, UAS 30 may be assigned a non-secure, sensitive, or covert mission type. In an example, only sensitive type missions use dummy aircraft information. Thus, for non-secure mission types, the ADS-B transponder 34 broadcasts an ADS-B message that includes the ICAO-assigned identification of the UAS 30. For sensitive missions, the ADS-B transponder 34 is provided dummy aircraft information including a dummy aircraft identification, which secures the identity of the UAS 30. Covert mission types may involve special use airspace and may not require public or ATC involvement. However, when flying a covert mission, the UAS operator 21 may file a special flight plan and UMAD 100 may follow high-security information dissemination procedures used for sensitive missions as disclosed herein, but in collaboration with a specialized covert mission flight plan. To successfully perform these functions, the module 340 may implement an efficient cryptographic algorithm solution to assign mission-sensitive UAS-unique identifier data and implements databases 301 for managing two potential sets of information for a given UAS operation (actual vs dummy data). In managing a potentially large data volume, UMAD program 300 ensures data integrity is maintained to make data validation and traceability to the actual UAS 30 feasible.

The dummy data generator module 350 generates dummy aircraft identification and dummy airframe information for the UAS 30 when the UAS is assigned to sensitive flight operations. However, the module 350 stores the actual UAS ID regardless of the flight or mission type. To further secure UAS identification, the module 350 generates mock civil UAS data that closely matches the performance profile of the operating UAS-30. The UAS operator 21 and ATC 40 personnel will have access to both sets of aircraft identifications for their own system automation and usage, while the UMAD 130 causes the transponder 34 to transmit only the dummy aircraft identification to civil/public entities.

The data output module 360 provides information generated during operation of the UMADs 120, 130, and 140 without negatively impacting current traffic information systems or ATC. An aspect of operation of the module 360 is the dissemination of actual identification information to NAS authorities who require it, including the local ATCs in the NAS region in which the UAS 30 operates.

The data management module 370 implements and manages database(s) 301, which store flight plan information for current flight operations, actual UAS-30 characteristics and performance data, the ICAO-assigned transponder code, and dummy aircraft information generated for the current flight operations. The database(s) 301 further may store civil aircraft data that components of the UMAD program 300 may access and use to generate dummy airframe information.

Figure 4:
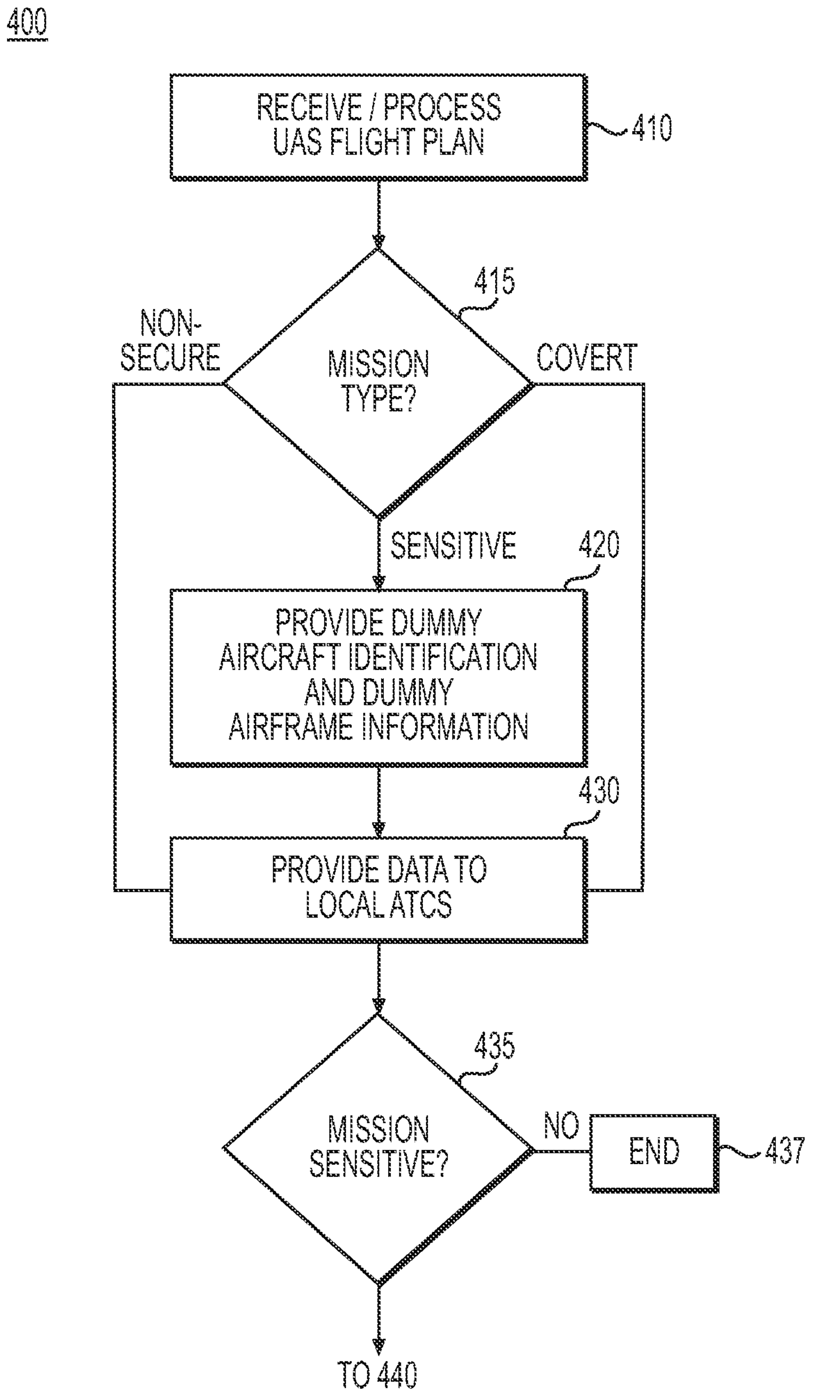
FIG. 4 is a flowchart illustrating an example operation executed by the UMAD program of FIG. 3.
Figure 4:
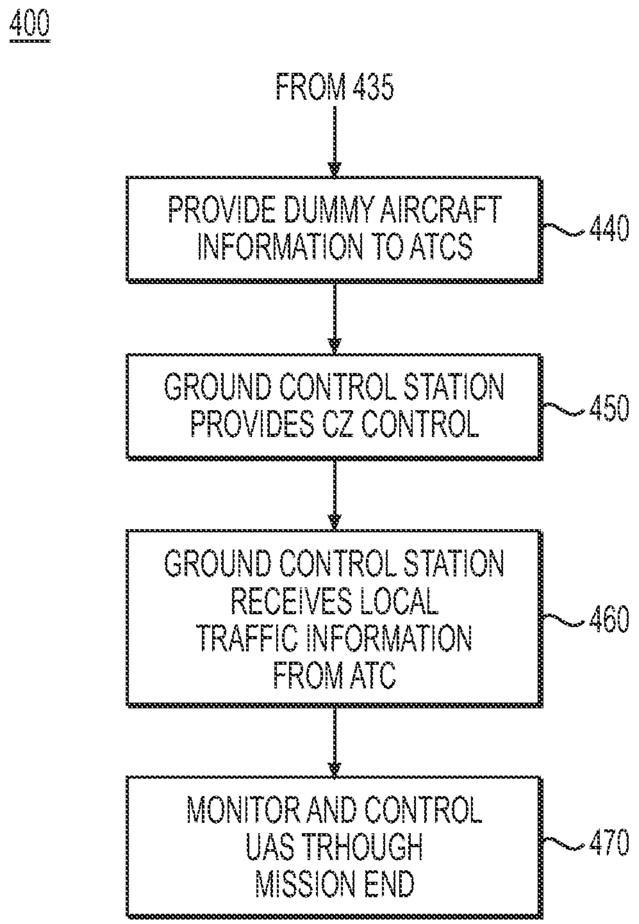

FIG. 4 illustrates an example operation of UMAD 100 in relation to flight operations of UAS 30 in the NAS. In FIG. 4, operation 400 begins in block 410 when the UMAD program 300 processes a flight plan for the flight operations of the UAS 30 in the NAS. The flight plan meets requirements of the FAA for flight operations. In particular, the flight plan includes UAS 30 flight profile information including altitude, speed and geographical position information. The flight plan also includes an ADS-B transponder code assigned to the UAS 30. The flight plan includes identities of all local ATCs with which the UAS 30 may interact during the flight operations. Either the flight plan for the UAS 30 or another data set includes the mission type for the UAS 30 (e.g., non-secure, sensitive, or covert). In an aspect, the mission type of the UAS may vary during the flight operations; for example, a first phase of the flight operations may be non-secure and a second phase may be sensitive.

In block 415, the UMAD program 300 determines the mission type(s). If the mission type throughout the flight is either non-secure or covert, the operation 400 moves to block 430. If the mission type is sensitive (for all or part of the flight operations), the operation 400 moves to block 420.

In block 420, the UMAD program 300 provides a dummy aircraft identification (e.g., a dummy ADS-B transponder code) to be broadcast by the ADS-B transponder 34 as a component of ADS-B signal 32. The UMAD program 300 also provides dummy airframe information to be broadcast by the ADS-B transponder 34 as another component of the ADS-B signal 32. In an aspect, the UMAD program 300 may generate dummy airframe information that corresponds to airframe information for an actual aircraft that could follow the received flight plan. For example, if an appropriately sized civil aircraft could execute the flight plan, the UMAD program 300 may provide the airframe information for the civil aircraft as the dummy airframe information. In this way, the broadcast ADS-B signal 32 will provide accurate data for other civil aircraft operating in the same NAS region(s) as the UAS 30.

In block 430, the flight plan and other information (e.g., the actual ADS-B transponder code) for the UAS 30 is provided to local ATCs. Next, in block 435, the UMAD program determines if the mission type is non-secure, sensitive, or covert. For non-secure and covert mission types, the operation 400 moves to block 437 and ends. For sensitive mission types, the operation moves to block 440. In block 440 additional information such as dummy aircraft information generated by the UMAD program 300 may be provided to the local ATCs.

In block 450, the ground control station 20 provides command and control of UAS 30 using satellite link 22.

In block 460, the local ground control station 20 receives ADS-R information from local ATCs in regions in which the UAS 30 operates.

In block 470, the ground control station 20 continues to monitor and control operation of the UAS 30 using the ADS-R information from the ATC 40. As an aspect of the operations of block 470, the ground control station 20 may monitor the dummy aircraft identification provided in the ADS-B signal 32 (sent to the ground control station 20 by the local ATC 40) to ensure the UAS is able remain "undetectable" by entities that do not possess a copy of the UMAD program 300. As another aspect of the operation of block 470, the local ground control station 20 may override operation of the UMAD program 300 installed on UAS 30.

In an example of FIG. 4, some aspects of the operation 400 may be executed by versions of the UMAD program 300 installed on the UAS 30, the ground control station 20, and the ATC 40. In another example, the UAS 30 may operate without a copy of the UMAD program 300; in this example, information such as the dummy aircraft information may be generated by the ground control station 20 and may be provided by the ground control station 20 to the UAS 30 and the local ATC 40.

Certain of the devices shown in the Figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the examples represented in FIG. 4. The disclosed devices, components, and systems contemplate using or implementing any suitable technique for performing the steps illustrated. Thus, FIG. 4 is for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. An Unmanned Aerial System (UAS) configured for operation in a National Airspace System (NAS) in compliance with Federal Aviation Administration (FAA) regulations, comprising:

a transponder system, comprising:

an automatic dependent surveillance-broadcast (ADS-B) transponder that operates to broadcast an ADS-B signal, and an X transponder that operates to broadcast a transponder signal;

radiofrequency equipment configured for communication using direct line of sight and satellite relay with one or more ground stations; and a processor system coupled to a non-transitory, computer-readable storage medium storing machine instructions for operation of the ADS-B transponder and the X transponder and for operation of the radiofrequency equipment, wherein the processor executes the machine instructions to:

receive a UAS flight plan for the UAS and a UAS operation, the UAS flight plan including a flight profile and flight path for the UAS, wherein a mission type for the UAS operation requires use of dummy aircraft information for at least a first portion of the UAS operation, receive a dummy UAS identification for the UAS, generate dummy airframe information comprising dummy airframe characteristics and dummy performance data for the UAS, the dummy airframe information corresponding to airframe information for a manned aircraft that could follow the received UAS flight plan, and controls the ADS-B transponder to broadcast the dummy UAS identification and the dummy airframe information with an automatic dependent surveillance-broadcast signal during at least the first portion of the UAS operation.

2. The UAS of claim 1, wherein the ADS-B transponder and the X transponder are configured as a single transponder.

3. The UAS of claim 1, wherein the X transponder comprises a transponder selected from a first transponder list consisting of a Mode C transponder, a Mode S transponder, and a Mode 5 transponder.

4. The UAS of claim 3, wherein the X transponder signal provides actual aircraft specification for the UAS, comprising UAS size and airworthiness.

5. The UAS of claim 4, wherein a Mode 5 transponder signal is encrypted.

6. The UAS of claim 1, wherein at least a second portion of the UAS operation does not require use of the dummy airframe characteristics and dummy performance data for the UAS, wherein the processor controls the ADS-B transponder to broadcast actual UAS information during the second portion of the UAS operation.

7. The UAS of claim 1, wherein the UAS flight operation is controlled through a command and control (C2) link between the UAS and a ground station.

8. The UAS of claim 7, wherein the C2 link is line of sight.

9. The UAS of claim 7, wherein the C2 link is by satellite relay.

10. The UAS of claim 7, wherein the UAS:
- receives a request directly from the ground station over the C2 link for a mission update; and
- in response to the request, the processor controls the UAS to provide the mission update directly to the ground station over the C2 link.

11. The UAS of claim 7, wherein the UAS:
- receives a request for a mission update from the ground station by way of relay from a local air traffic controller (ATC); and
- in response to the request, the processor controls the UAS to relay the mission update to ground station by way of the ATC.

12. A method, comprising:
- a processor onboard an Unmanned Aerial System (UAS) executes machine instructions to:
  - receive a UAS flight plan for the UAS and a UAS operation, the UAS flight plan including a flight profile and flight path for the UAS, wherein a mission type for the UAS operation requires use of dummy aircraft information for at least a first portion of the UAS operation,
  - receive a dummy UAS identification for the UAS,
  - generate dummy airframe information comprising dummy airframe characteristics and dummy performance data for the UAS, the dummy airframe information corresponding to airframe information for a manned aircraft that could follow the received UAS flight plan, and
  - control an ADS-B transponder onboard the UAS to broadcast the dummy UAS identification and the dummy airframe information with an automatic dependent surveillance-broadcast signal during at least the first portion of the UAS operation.

13. The method of claim 12, wherein the processor controls an X transponder on the UAS to broadcast an encrypted signal comprising actual UAS information during the first portion of the UAS operation.

14. The method of claim 12, wherein the UAS operation comprises a second portion, and wherein during the second portion the processor controls the ADS-B transponder to broadcast actual UAS information during the second portion of the UAS operation.

15. The method of claim 12, wherein the UAS flight operation is controlled through a command and control (C2) link between the UAS and a ground station.

16. The method of claim 15, wherein the C2 link is one of a line of sight link and a satellite relay link.

17. A non-transitory, computer-readable storage medium having encoded thereon machine instructions that when executed, control an Unmanned Aerial System (UAS) for modernization and avoidance of detection (UMAD) system, wherein a processor executes the machine instructions to:
- receive a UAS flight plan for a UAS and a UAS operation, the UAS flight plan including a flight profile and flight path for the UAS, wherein a mission type for the UAS operation requires use of dummy aircraft information for at least a first portion of the UAS operation,
- receive a dummy UAS identification for the UAS,
- generate dummy airframe information comprising dummy airframe characteristics and dummy performance data for the UAS, the dummy airframe information corresponding to airframe information for a manned aircraft that could follow the received UAS flight plan, and
- generate a signal to control an ADS-B transponder onboard the UAS to broadcast the dummy UAS identification and the dummy airframe information with an automatic dependent surveillance-broadcast signal during at least the first portion of the UAS operation.

18. The non-transitory, computer-readable storage medium of claim 17, wherein the computer readable storage medium and the processor are installed at a ground station in communication with the UAS.

19. The non-transitory, computer-readable storage medium of claim 17, wherein the computer readable storage medium and the processor are installed onboard the UAS.

20. The non-transitory, computer-readable storage medium of claim 19, wherein the processor controls an X transponder on the UAS to broadcast an encrypted signal comprising actual UAS information during the first portion of the UAS operation.

* * * * *